United States Patent [19]

Barnhoorn et al.

[11] Patent Number: 4,491,611
[45] Date of Patent: Jan. 1, 1985

[54] PROCESS FOR THE PREPARATION OF SELF-CROSS-LINKING RESINOUS BINDERS AND THEIR USE IN SURFACE COATING COMPOSITIONS

[75] Inventors: Adrianus J. M. Barnhoorn; Werner T. Raudenbusch, both of Amsterdam, Netherlands

[73] Assignee: Shell Oil Company, Houston, Tex.

[21] Appl. No.: 588,606

[22] Filed: Mar. 12, 1984

Related U.S. Application Data

[62] Division of Ser. No. 430,469, Sep. 30, 1982, Pat. No. 4,559,393.

[30] Foreign Application Priority Data

Dec. 9, 1981 [GB] United Kingdom ............... 8137056

[51] Int. Cl.³ ............................................. C08L 63/10
[52] U.S. Cl. ................................. 427/386; 204/181 C; 427/387; 523/404; 523/414; 523/417
[58] Field of Search ............... 523/482, 414, 404, 417; 204/181 C; 427/386, 387

[56] References Cited

U.S. PATENT DOCUMENTS

| | | | |
|---|---|---|---|
| 3,816,366 | 6/1974 | Laudise | 525/530 |
| 3,878,145 | 4/1975 | Güldenpfennig | 525/530 |
| 4,167,499 | 9/1979 | Hazan | 523/423 |
| 4,246,089 | 1/1981 | Hazan | 525/530 |
| 4,332,711 | 6/1982 | Kooijmans et al. | 523/402 |
| 4,340,523 | 7/1982 | Hazan | 525/530 |
| 4,362,847 | 12/1982 | Kooijmans et al. | 525/172 |
| 4,376,848 | 3/1983 | Subramanyam et al. | 525/530 |
| 4,423,167 | 12/1983 | Valko | 204/181 C |
| 4,423,169 | 12/1983 | Valko | 204/181 C |

*Primary Examiner*—Allan M. Lieberman
*Attorney, Agent, or Firm*—Norris E. Faringer

[57] ABSTRACT

Catalytically self-cross-linking resinous binders are prepared by (a) addition reaction of a primary amine to a beta-hydroxyalkyl ester of an alpha, beta-ethylenically unsaturated acid, and (b) reaction of this secondary amine adduct, optionally in combination with other amines, with an epoxy resin. Curing catalysts are transesterification-promoting metal compounds. Protonized binders can be used in a cathodic electrodeposition bath.

9 Claims, No Drawings

PROCESS FOR THE PREPARATION OF SELF-CROSS-LINKING RESINOUS BINDERS AND THEIR USE IN SURFACE COATING COMPOSITIONS

This is a division of Ser. No. 430,469 filed Sept. 30, 1982, and now U.S. Pat. No. 4,559,393.

FIELD OF THE INVENTION

The invention relates to the preparation of catalytically self-cross-linking resinous binders which are non-acidic and soluble, and to their use in surface coating compositions, in particular, for cathodic electrodeposition.

BACKGROUND OF THE INVENTION

It is known that beta-hydroxyalkyl esters of polycarboxylic acids can be used as cross-linking components for the cure of non-acidic, hydroxyl-containing, resinous compounds in the presence of transesterification-promoting metal compounds as curing catalysts. See, for example, U.S. Pat. No. 4,332,711 issued June 1, 1982, and U.S. patent application Ser. No. 255,196, filed Apr. 20, 1981, and now U.S. Pat. No. 4,362,847. Such systems operate by transesterification of beta-hydroxyalkyl ester groups of the cross-linking component with hydroxyl groups of the resinous component, with elimination of a glycol.

A novel and convenient method for combining the two functions into the same molecule has now been discovered. These binders may be conveniently used in cathodic electrodeposition from an aqueous bath since the beta-hydroxyalkyl function will move at exactly the same rate as the resinous material in an electrical field.

SUMMARY OF THE INVENTION

The present invention particularly provides a process for the preparation of a catalytically self-cross-linking resinous binder, characterized by the steps of:
(A) reacting a beta-hydroxyalkyl ester of an alpha, beta-ethylenically unsaturated carboxylic acid with a primary mono- or polyamine in such molar ratios that the resulting product has an average from 1 to 2 aminohydrogen atoms per molecule, and
(B) reacting the product of (A), optionally, together with one or more other amines each having from 1 to 2 aminohydrogen atoms per molecule, with a polyglycidyl ether of a polyhydric phenol in such amounts that there is not more then one aminohydrogen atom per epoxy group, and that the final adduct has, on average, more than one beta-hydroxyalkyl ester group per molecule.

Conveniently, step (A) involves a Michael-type addition of a primary amine to a beta-hydroxyalkyl ester of acrylic acid or methacrylic acid, and step (B) involves the further reaction of the resulting secondary amine adduct with glycidyl groups of an epoxy resin. These reactions are rather selective, and formation of inconvenient byproducts can easily be avoided.

The alpha, beta-ethylenically unsaturated carboxylic acids are exemplified by acrylic acid, methacrylic acid, and crotonic acid. Beta-hydroxyalkyl groups can be incorporated by reacting, for example, the acid with a nonepoxide. Many of the beta-hydroxyalkyl esters are known in the art, for example hydroxyethyl acrylate, hydroxyethyl methacrylate, 2-hydroxypropyl acrylate, 2-hydroxypropyl methacrylate, 2-hydroxybutyl acrylate, 2-hydroxybutyl methacrylate. Hydroxyethyl acrylate is preferred. Another preferred beta-hydroxyalkyl ester is the reaction product of equimolar amounts of acrylic acid and glycidyl esters of branched monocarboxylic acids. Branched monocarboxylic acids as herein referred to are saturated aliphatic monocarboxylic acids, wherein the carboxyl group is attached to a tertiary or quaternary carbon atom and which contain 9 to 11, preferably 10, carbon atoms per molecule. The glycidyl ester thereof is a commercial product. The esters of branched monocarboxylic acids are difficult to hydrolyze or to transesterify; therefore, in the reaction product with acrylic acid the ester function of the branched monocarboxylic acids is stable under normal conditions of handling, including stoving. Reaction of acrylic or methacrylic acid with the glycidyl esters of branched monocarboxylic acids will provide a 2-hydroxy-substituted by the stable ester group of the branched monocarboxylic acids.

The amine which is reacted with the unsaturated ester is preferably an aliphatic amine. Mono- or polyamines may be used provided that they have at least one primary amino group. Examples are methylamine, ehtylamine, monoethanolamine, ethylene diamine, 1,6-diamino hexane. The amines may have other substituents which do not react with carbon-carbon double bonds, such as tertiary amine functions. The relative amounts of the reaction components are so chosen that the resulting adduct has an average from 1 to 2 aminohydrogen atoms per molecule. An aminohydrogen fucntionality of on average more than 2 is not advised, in view of difficulties which can then be expected in the step wherein the adduct is reacted with the polyepoxide.

When a primary monoamine is used, a complete reaction to the desired adduct will involve a molar ratio amine/ester of 1:1; a lower amount of ester will leave part of the amine unreacted, which may be desirable if in the next step the same primary monoamine is a co-reactant.

For a di-primary amine such as 1,6-diaminohexane the molar ratio of ester/amine should be at least 2:1, to make sure that the adduct has on average not more than 2 aminohydrogen atoms per molecule.

The reaction conditions for the Michael addition are very mild. The temperature is kept at room temperature or below by cooling, for example with ice or a refrigerating system. The pressure can be atmospheric. To avoid formation of tertiary amine functions, the amine, preferably diluted with an organic solvent, is introduced first into the reactor, and the ester of the alpha, beta-ethylenically unsaturated acid is then added slowly with stirring and cooling. The Michael addition is an addition of amine to the beta-carbon atom of the double bond. For ethanolamine and hydroxyethyl acrylate in a 1:1 molar ratio the main reaction is as follows:

HO—CH$_2$—CH$_2$—NH$_2$ +     (1)

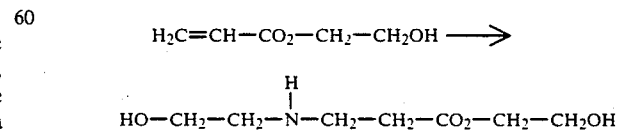

It is known that Michael additions as described above are very fast, exothermic and complete; as the unsaturated ester is in underdose with regard to the available aminohydrogen, the final product of step (A) will not contain unsaturated ester.

The product of step (A) is used as a reactant in step (B), the addition to a polyglycidyl ether of a polyhydric phenol.

Preferred are polyglycidyl ethers of 2,2-bis(4-hydroxyphenyl)propane having the general formula:

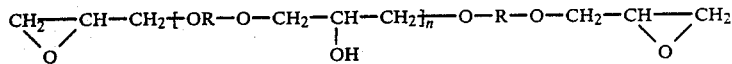

wherein R is the group:

and n is a number which will differ for ethers of different molecular weight. In ethers which are liquid or semi-liquid at room temperature n has an average value of from 0 to 1.

For the present invention ethers are preferred which are solid at room temperature and wherein n has average values of from 2 to 4. In the latter ethers, part of the terminal epoxy groups may be hydrolyzed to glycol groups, due to the methods of preparation.

In step (B) the reaction products of step (A) are preferably used in combination with one or more other amines, preferably aliphatic amines, each having from 1 to 2 amino hydrogen atoms per molecule. The reaction which takes place in step (B) is the addition of amine to epoxide, according to the general equation:

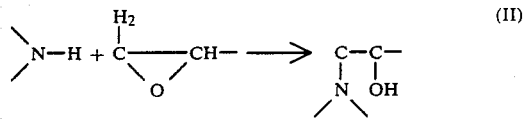

whereby a hydroxyl group is formed for every amino hydrogen function added. This will provide sufficient hydroxyl functionality for later cross-linking.

More than one beta-hydroxyalkyl ester group in the final adduct is required for efficient cross-linking, and an excess of amino-hydrogen over epoxy should be avoided to make maximum use of the amino-hydrogen functions and the beta-hydroxyalkyl ester functions. The aminohydrogen to epoxy ratio of preferably from 90–100%, more preferably from 95 to 100%, in particular as near as 100% as possible.

The other amines optionally used in step (B) may be primary or secondary amines, each having from 1 to 2 aminohydrogen atoms per molecule; they may have other groups in the molecule, such as hydroxyl or tertiary amine functions, less reactive with epoxy compunds than primary or secondary amines under reaction conditions (60°–90° C. during 2–5 hours). Mixtures of amines may be used. Examples of other amines are ethanolamine, diethanolamine, n-dodecylamine, and 3-(dimethylamine)propylamine.

Step (B) can, if desired, be carried out in solution in a solvent in which the reaction components and the product dissolve.

The resulting product of step (B) is an epoxy/amine adduct having tertiary amino functionality, having hydroxyl functionality, and having beta-hydroxyalkyl ester groups. For the preparation of a thermosetting composition it can be mixed with a transesterification-promoting metal compound as curing catalyst.

The resulting compositions can be applied onto a surface, and cured at a temperature not higher than 200° C. to form an insoluble, infusible coating (on the surface).

The transesterification-promoting metal compound is preferably a metal salt or complex that is soluble in liquid hydrocarbons, such as white spirit or xylene. A commercially available concentrated solution in such a solvent can then easily be homogeneously diluted with a part of the accelerator. In view of the small amounts of accelerator needed in the final binder composition this technique is recommendable. Preferred salts meeting that requirement are in general 2-ethyl hexoates (octoates) and naphthenates. Further, when these metal salts or complexes are insoluble or substantially insoluble in water, potential adverse effects by leaching out of accelerator into the aqueous phase of the aqueous suspensions are avoided.

Very suitable in view of their generally high activity are salts (for example octoates or napthenates) of lead, zinc, calcium, barium and iron(III). A suitable example of a metal complex is titanium acetyl acetonate. Other suitable salts, although in general less active than those mentioned above, are salts of tin(II), manganese, cobalt, and dibutyltin, for example dibutyltin dilaurate. Further metal salts can be mentioned, in general, are octoates and naphthenates of the alkali and earth alkali metals, of the lanthanides, and of zirconium, cadmium, chromium, and acetyl acetonate complexes of lead, zinc, cadmium, cerium, thorium and copper.

Mixtures of such salts and/or complexes can also be used. Some of the salts or complexes mentioned above are known as esterification and transesterification catalysts for the preparation of alkyd resins, epoxy resin esters, and linear polyesters for fibers, in general for the preparation of fusible polyesters which are soluble in organic solvents. However, the temperatures used there are generally far above 200° C., the reaction times at least some hours, and the amount of catalyst is usually very low, below 0.1% by weight of the polyester. None of these uses indicated that these salts could be used as cross-linking accelerators in coatings, i.e. for the formation of insoluble, infusible polyester-like coatings, as in the present binder compositions.

In the present compositions these accelerating salts or complexes can be used in amounts of 0.1–6, preferably 1–6 percent of the weight of resinous binder. In view of the varying metal content of available metal salts or complexes or solutions thereof the amount of catalyst is more conveniently indicated by the metal content in the compositions; metal contents of 0.3 to 2.0 percent by weight are suitable in general, and metal contents of 0.5–1.8 percent by weight are preferred.

Other transesterification-promoting metal compounds that can be used in the present compositions are certain metal salts and oxides that are insoluble in liquid hydrocarbons, but may be soluble in other solvents such as water, alcohols, ethers, ketones, and esters, or mixtures thereof. Insoluble in liquid hydrocarbons can be defined more precisely in that the solubility in toluene at 20° C. should be not more than 0.02 percent by weight. These metal compounds are usually solids at room temperature, and may be used in finely divided form and/or in solutions. Examples are the pigments lead silicate, red lead ($Pb_2O_4$), lead oxide (PbO), zinc chromate, zinc tetraoxydichromate, and lead silico chromate, the oxide antimony trioxide, and the acetates, formates and carbonates of Pb, Zn, Fe, Li, Cd and Bi. The quantity of the pigments needed is sometimes such as to exclude their used when the pigmentation they will provide (e.g., white, yellow or red) is not desired. On the other hand, such pigments may be desirable for improvement of corrosion resistance, for example in primers. These pigments may sometimes provide the desired transesterification activity in pigment/binder weight ratios from 0.02:1 upwards, more preferably from 0.1:1 upwards. Water-soluble salts, sometimes in the form of hydrates or aqueous solutions, may be desirable in aqueous coating compositions. Metal salts as mentioned above may be used in amounts of 1-8, preferably 3-8 percent by weight of the binder. Complex-forming agents may be added to improve the activity of some of these metal compounds, in particular those of zinc, upon cure, and/or to improve surface properties of a cured coating. Examples are acetyl acetic esters, acetyl acetone, 8-hydroxy quinoline. For example, zinc oxide (inactive in the gelation test) may show slight activity in an electrodeposition test; activity and surface appearance may then be improved by addition of a complex-forming agent.

Mixtures of metal compounds that are soluble and insoluble in liquid hydrocarbons can also be used.

Determination of the gelation time on a hot plate at 180° C. is a very useful rapid test using simple equipment for a first indication of activity. The resinous binder is mixed with the metal compound to be tested, and the mixture is subjected to the gelation test. A resinous binder without accelerator will have a gelation time of 600 seconds or more, whereas satisfactory cure can be expected at gelation times of 400 seconds and below. The gelation test can be used to obtain a general indication of suitability of a metal compound or mixture, and for further selection of suitable components and their weight ratio. Only small samples will suffice (about 0.5 g of solids for each test), the compounding is very easy, and the result is available immediately after the test.

The composition of resinous binder and catalyst may be diluted with suitable volatile organic solvents, for example to regulate the viscosity or the solids content of the final paint or lacquer. Conventional paint additives may be incorporated, such as pigments, fillers, dispersants, stabilizers, flow control agents, and the like.

The lacquers or paints can be applied by usual methods, such as by brush, roller, by spraying, dipping, and the like onto a variety of materials, preferably metals, such as bare steel, phosphated steel, zinc, tin plate (as a can lacquer), as the case may be as the sole coating layer or as a primer or top coat. For use as electrodeposition primers the resinous binder is protonized by at least partial neutralization, for example 20 to 100%, of the amino functions with an acid, preferably an organic carboxylic acid, such as formic acid, acetic acid, citric acid, or preferably lactic acid. These protonized binders may be used in 2-20% by weight in aqueous dilutions, solutions or dispersions in cathodic electrodeposition baths. The resinous binder may first be diluted with a water-soluble organic solvent such as a glycol ether, for example to simplify the neutralization or the dilution with water. The aqueous electrodeposition baths may also contain conventional additives, such as pigments, fillers, dispersants, stabilizers, flow control agents, and the like. The baths can be used for applying coatings to steel that has or has not been phosphated.

The invention is illustrated by examples. Parts therein are parts by weight, unless otherwise stated or apparent from the context. It is understood that the components, amounts and order of reaction are illustrative only and other modifications within the scope of the present invention will become apparent to one skilled in the art.

Polyether D is a commercial solid glycidyl polyether of 2,2-bis(4-hydroxyphenyl)propane having an epoxy equivalent weight (EEW) of 472, a hydroxyl content of 0.29 equivalent per 100 g, and a molecular weight ($\overline{M}n$) of about 900.

Glycidyl ester C10E is a commercial glycidyl ester of saturated aliphatic monocarboxylic acids, wherein the carboxyl group is attached to a tertiary or quaternary carbon atom and which monocarboxylic acids have on average 10 carbon atoms per molecule; the glycidyl ester has an EEW of 250.

Pb octoate solution is a commercial solutions of Pb 2-ethyl hexoate in a hydrocarbon solvent; Pb-content 33% w.

Water is demineralized water.

Impact resistance or impact strength (IS) is the reversed impact strength, determined according to the British Standard Falling Ball test, but recorded in cm.kg; >90 cm.kg indicates very good cure. Salt spray resistance was according to ASTM-B 117-64 and recorded as mm loss of adhesion from scratch after the number of days indicated. MEK rubs is the number of rubs to be given to the cured coating with a cloth wetted with methyl ethyl ketone (MEK). MEK rubs of 50 is an indication of a good cure.

EXAMPLE I (a) Acrylate of glycidyl ester C10E

Glycidyl ester C10E (500 g, 2 epoxy equivalent), commercial acrylic acid (150.6 g, 2 carboxyl equivalent), hydroquinone (0.15 g) and triphenyl phosphine (0.15 g) were reacted at 145°–150° C. for three hours. During the reaction, a steady stream of air (40 ml/min.) was passed through the mixture in order to inhibit polymerization of the acrylic double bonds. The acrylic ester obtained which has the formula:

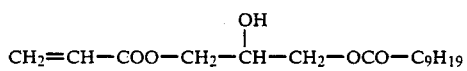

was a light brown liquid having a viscosity of 0.12 Pa.s (23° C.). The residual acid and epoxy contents were 0.09 and 0.02 meq/g, respectively.

(b) Adduct of acrylate (a) and 1,6-diamino hexane

Acrylate from Example I(a) (260.2 g; 0.80 mole) was added dropwise during one hour to a stirred solution of 1,6-diamino hexane (46.6 g; 0.40 mole) in 1,2-dimethoxyethane (306.6 g). The reaction was exothermic and ice-cooling was applied to keep the temperature between 15° and 20° C. The clear solution had a solids content of 50% w and an amino-N content of 1.28 meq/g (solution). The complete addition of acrylic double bonds and amino groups was verified by IR spectrometry (absence of absorptions at 1620 and 1640 cm$^{-1}$). The structure ascribed to the adduct was:

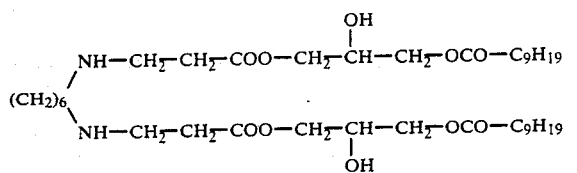

(c) Self-cross-linking cationic binder

Polyether D (236 g; 0.5 epoxy equivalent) was heated in 1,2-di-methoxy ethane (58 g) under reflux until dissolved. The clear solution was cooled to 60° C., diethanolamine (26.2 g; 0.25 mole) and the adduct from Example 1(b) (191.6 g of the 50% w solution, 0.125 mole) were added at once, and the mixture was heated at 75° C. for 3 hours. A clear binder solution having a solids content of 70% w was obtained. The residual epoxy content was zero and the amino-N content was 0.96 meq/g solution (calculated 0.976 meq amino-N/g solution).

(d) Cathodic electrodeposition paint

Binder solution from Example I(c) (185.7 g; 130 g solids) was mixed with Pb octoate solution (2.6 g), ethylene glycol monobutylether (31 g), and protonized with acetic acid (5.3 g). Water (209 g) was added slowly with stirring to form and aqueous binder solution. A pigment paste was prepared from 200 g of this aqueous binder solution, titanium dioxide (10 g), lead silicate (4 g), clay ASP-100 (4 g) and carbon black (2 g) in a sand mill. The pigment paste was diluted with a further quantity of the aqueous binder solution (233 g) and water (547 g); the resulting paint had:

| solids content | 15% w |
|---|---|
| pH | 5.6 |
| specific conductivity (25° C.) | 1950 micro S/cm |

The paint was electrodeposited cathodically onto degreased, cold-rolled steel panels at 150 V dc./2 minutes, the panels were rinsed with water and stoved at 180° C./30 minutes.

Properties of the cured coating:

| appearance | smooth. gray |
|---|---|
| thickness (micrometers) | 14–16 |
| MEK rubs | >50 |
| impact strength (cm. kg) | >90 |
| salt spray resistance (20 days), mm | 5 |

EXAMPLE II

(a) Adduct of 2-hydroxyethyl acrylate and 1,6-diamino hexane.

A solution of 1,6-diamino hexane (29 g; 0.25 mole) in ethylene glycol monobutyl ether (60 g) was cooled with ice. 2-Hydroxyethyl acrylate (58 g; 0.50 mole), diluted with ethylene glycol monobutyl ether (70.5 g) was added dropwise with stirring during one hour, with icecooling to keep the temperature between 0° and 5° C. The resulting adduct solution had a solids content of 40% w and an amino group content of 2.22 meq/g solution (theory: 2.29 meq/g solution). IR spectroscopy indicated an essentially complete conversion of all acrylic groups. The structure ascribed to the adduct was:

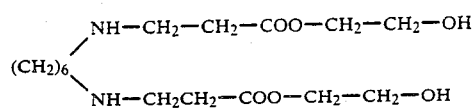

(b) Self-cross-linking cationic binder

Polyether D (236 g; 0.5 epoxy equivalent) was heated in ethylene glycol monobutyl ether (59 g) until dissolved. The solution was allowed to cool to 70° C., diethanolamine (26.2 g; 0.25 mole) and the adduct of Example II(a) (109 g of 40% solution; 0.125 mole) were added, and the mixture was stirred for 3 hours at 70°–75° C. The resulting clear binder solution had a solids content of 71.1% w, a residual epoxy content of zero and an amino-N content of 1.12 meq/g solution.

(c) Cathodic electrodepositions paint

Cationic binder solution from Example II(b( (168.8 g; 120 g solids) was mixed with Pb-octoate solution (2.4 g) and acetic acid (5.6 g). Water (224 9g) was added gradually to form an aqueous binder solution with a solids content of 30% w.

A pigment paste was prepared from this aqueous binder solution (200 g), titanium dioxide (15 g), lead silicate (6 g), clay ASP-100 (6 g) and carbon black (3 g) in a sand mill. The pigment paste was diluted with a further quantity of the aqueous binder solution (200 g) and water (570 g).

The resulting paint had:

| solids content | 15% w |
|---|---|
| pH | 5.8 |
| specific conductivity (25° C.) | 2030 micro S/cm |

The paint was electrodeposited and stoved as described in Example I(d). The cured coatings formed were well cross-linked but less smooth than those of Example I(d); properties were:

| color | gray |
|---|---|
| thickness (micrometers) | 16–20 |
| MEK rubs | >50 |
| impact strength (cm. kg) | >90 |
| salt spray resistance (20 days), mm | 3–6 |

EXAMPLE III

(a) Adduct of 2-hydroxy ethyl acrylate and ethanolamine

Ethanolamine (61 g; 1.0 mole) was dissolved in 1,2-dimethoxyethane (177 g). 2-Hydroxyethyl acrylate (116 g, 1.0 mole) was added dropwise with rapid stirring. The addition time was one hour and the temperature of the solution was kept between 5° and 10° C. by cooling with ice. The resulting clear solution had a solids content of 50% w and an amino-N content of 2.75 meq/g solution.

The structure of the adduct was:

HO—CH$_2$—CH$_2$—NH—CH$_2$—CH$_2$—COO—CH$_2$—CH$_2$—OH (b) Self-cross-linking cationic binder Polyether D (472 g; 1.0 epoxy equivalent) was heated in 1,2-di-methoxyethane (172 g) under reflux until dissolved. The clear solution was cooled to 60° C., n-dodecylamine (46.3 g; 0.25 mole) and the adduct from Example III(a) (177 g of 50% w solution; 0.50 mole) were added at once. The mixture was heated between 70° and 75° C. for 3 hours. The viscous clear binder solution had a solids content of 70% w, a residual epoxy content of essentially zero and an amino-N content of 0.84 meq/g solution.

(c) Cathodic electrodpeosition paint

Cationic binder solution from Example III(b) (171.4 g; 120 g solids), ehtylene glycol monobutyl ether (29 g) and acetic acid (6.0 g) were mixed together. Water (194 g) was added gradually with stirring to form an aqueous binder solution. A pigment paste was made from this aqueous binder solution (200 g), clay ASP-100 (20.5 g), carbon black (3 g), lead silicate (4.2 g) and strontium chromate (2.3 g) in a sand mill. This pigment paste was thinned with a further quantity of the aqueous binder solution (200 g) and water (570 g) to give black paint having a solids content of 15% w and a pH of 5.0. Electrodeposition and stoving were carried out as in Example I(d). Well cross-linked black coatings with the following properties were obtained:

| | |
|---|---|
| thickness (micrometers) | 13–17 |
| MEK rubs | >50 |
| impact strength (cm. kg) | >90 |
| salt spray resistance (20 days), mm | 3–5 |

EXAMPLE IV (a) Self-cross-linking cationic binder

Polyether D (354 g; 0.75 epoxy equivalent) was heated in diethylene glycol diethyl ether (152 g) at 100° C., diethanolamine (26.2 g; 0.25 mole), 3-dimethylaminopropylamine (12.7 g; 0.125 mole) and the adduct of Example I(b) (191 g of 50% w solution, 0.125 mole) were added and the mixture was stirred at 65°–70° C. for 3 hours. A clear, viscous cationic binder solution having a solids content of 66.3%, epoxy content of zero and amino-N content of 0.98 meq/g solutions was obtained.

(b) Cathodic electrodeposition paint

Cationic binder solution of Example IV(a) (196.1 g; 130 g solids) was blended with Pb octoate solution (2.6 g), ethylene glycol monobutyl ether (20 g) and acetic acid (5.8 g). Water (239 g) was gradually added to form an aqueous binder solutions of 28% solids.

A pigment paste was made from part of this solutions (200 g), titanium dioxide (10 g), lead silicate (4 g), clay ASP-100 (4 g) and carbon black (2 g) in a sand mill. This pigment paste was thinned with more of the aqueous binder solutions (263 g) and with water (517 g) to give a gray paint having solids content 15% w, pH 6.1 and specific conductivity 2100 micro S/cm (25° C.).

Electrodeposition and stoving were carried out as described in Example I(d). 15–18 micrometers thick gray coatings were obtained which were well cross-linked (MEK rubs >50, impact strength >90 cm.kg).

What is claimed is:

1. An aqueous paint composition suitable for cathodic electrodeposition comprising:
   (1) a resinous binder composition prepared by a process which comprises
      (a) reacting a beta-hydroxyalkyl ester of an alpha, beta-ethylenically unsaturated carboxylic acid with a primary mono- or polyamine in such molar ratios that the resulting product has on average from 1 to 2 aminohydrogen atoms per molecule;
      (b) reacting the product of (a) with a polyglycidyl ether of a polyhydric phenol in such amounts that there is not more than one aminohydrogen atom per epoxy group, and that the final adduct has on average more than one beat-hydroxyalkyl ester group per molecule, and optionally, together with one or more other amines each having from 1 to 2 aminohydrogen atoms per molecule; and
      (c) protonizing the resulting product by at least partial neutralization of the amino functions with an acid; and
   (2) from 0.1 to 6.0 percent by weight of the resinous binder of (1) of one or more transesterification-promoting metal compounds.

2. The composition of claim 1 wherein the beta-hydroxyl ester of step (a) is a 1:1 molar adduct of acrylic acid and a glycidyl ester of saturated aliphatic carboxylic acids wherein the carboxyl group is attached to a tertiary or quaternary carbon atom.

3. The composition of claim 1 wherein the beta-hydroxyalkyl ester of step (a) is hydroxyethyl acrylate.

4. The composition of claim 1 wherein the acid of step (c) is an organic carboxylic acid.

5. The composition of claim 4 wherein the organic carboxylic acid is acetic acid.

6. The compositoin of claim 1 wherein the transesterification-protonic metal compound is a metal salt or oxide which is insoluble in liquid hydrocarbons.

7. The composition of claim 6 wherein the metal compound is a lead compound.

8. The composition of claim 7 wherein the lead compound is lead octoate.

9. A process for the preparation of an insoluble, infusible coating on a surface comprising applying the composition of claim 1 onto the surface and curing the coating at a temperature not higher than 200° C.

* * * * *